United States Patent
Wang et al.

(10) Patent No.: US 10,723,310 B2
(45) Date of Patent: Jul. 28, 2020

(54) SEATBELT PRETENSIONING RETRACTOR ASSEMBLY

(71) Applicant: AUTOLIV ASP, INC., Ogden, UT (US)

(72) Inventors: Bin Wang, Orion Township, MI (US); Richard William Koning, Lynn Township, MI (US); Jon E. Burrow, Ortonville, MI (US); Christopher D. Hall, Algonac, MI (US); Ken Kohlndorfer, Roseville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 252 days.

(21) Appl. No.: 15/881,325

(22) Filed: Jan. 26, 2018

(65) Prior Publication Data
US 2019/0232916 A1    Aug. 1, 2019

(51) Int. Cl.
*B60R 22/46*    (2006.01)
*B60R 22/02*    (2006.01)

(52) U.S. Cl.
CPC .......... *B60R 22/4623* (2013.01); *B60R 22/46* (2013.01); *B60R 22/4628* (2013.01); *B60R 22/023* (2013.01)

(58) Field of Classification Search
CPC ... B60R 22/023; B60R 22/46; B60R 22/4623; B60R 22/4628
See application file for complete search history.

(56) References Cited

U.S. PATENT DOCUMENTS

| | | |
|---|---|---|
| 5,881,962 A | 3/1999 | Schmidt et al. |
| 7,318,607 B2 | 1/2008 | Clute |
| 7,581,757 B2 | 9/2009 | Clute |
| 7,963,473 B2 | 6/2011 | Clute |
| 7,988,084 B2 | 8/2011 | Lombarte et al. |
| 2006/0243843 A1 | 11/2006 | Clute |
| 2009/0218803 A1* | 9/2009 | Friedsmann ........ B60R 22/4628 280/807 |
| 2012/0006925 A1 | 1/2012 | Burrow et al. |

\* cited by examiner

*Primary Examiner* — Sang K Kim
(74) *Attorney, Agent, or Firm* — Dickinson Wright PLLC

(57) ABSTRACT

A seatbelt pretensioning retractor assembly for use in a passenger vehicle is provided. The pretensioning assembly includes a one-piece tread head pinion including a ring portion having a plurality of teeth and a pair of flanges on each side of the teeth. The tread head pinion is formed as a single piece and includes a shaft extending from a side and a bearing portion extending from a second side. A bending element mounting portion extends from the bearing portion. The one-piece tread head pinion is attached to a spindle via a torsion bar, and the spindle bears against the bearing portion when the spindle rotates relative to the tread head pinion. The one-piece tread head pinion may include a staking cavity extending into the bearing portion with a staking wall that is deformable toward a digressive bending element inserted into the staking cavity.

16 Claims, 13 Drawing Sheets

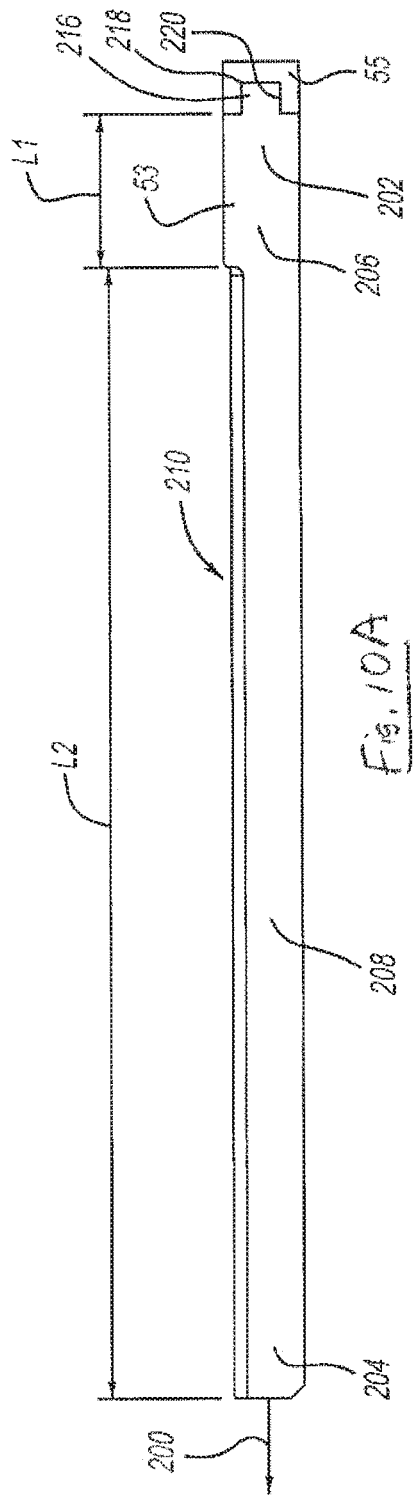
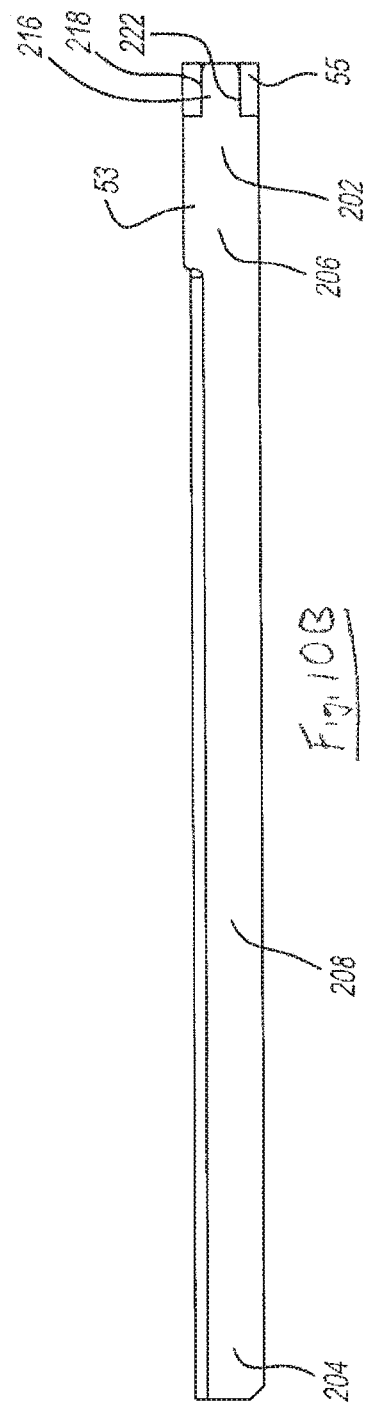

SEATBELT PRETENSIONING RETRACTOR ASSEMBLY

TECHNICAL FIELD

The technical field relates generally to seatbelt restraint devices for restraining an occupant of a vehicle, and more particularly, to devices for pretensioning a seatbelt.

BACKGROUND

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt. Various designs of retractor pretensioners presently exist, including a type known as a roto-pretensioner that incorporates a gas generator for generating a pyrotechnic charge. Examples of such roto-pretensioners are described in U.S. Pat. No. 5,881,962, filed Apr. 11, 1995, U.S. Patent Application Publication No. 2006/0243843, filed Apr. 27, 2005, U.S. Patent Application Publication No. 2012/0006925, filed Jul. 6, 2010, and U.S. Pat. No. 7,988,084, filed Aug. 2, 2011, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack and pinion, or series of balls disposed in a pretensioner tube, which engage with and wind a retractor spool sprocket to retract the webbing.

One issue with pretensioners using a series of metallic balls is the weight of the series of balls required for a full pretensioning stroke, as well as the corresponding cost of supplying multiple metallic balls with strict tolerances. Further, for pretensioners using a series of metallic balls, or rack and pinion based systems, is the need for a synchronizing or clutch feature to ensure that the series of balls or pinion sufficiently engage the retractor spool sprocket.

Another issue with pretensioners is known as a low resistance condition, where the driving elements will reach an end of stroke without experience substantial resistance. This can occur if there is excessive slack in the seatbelt webbing. In these cases, the low resistance results in a lower amount of backpressure from the driving elements. The backpressure is produced by the engagement between the driving elements and the sprocket, so lower backpressure reduces the pressure on a sealing element that trails the driving elements. Reduced pressure on the sealing elements reduces the amount that the sealing element is compressed circumferentially. Reduced sealing ability can cause gas to leak from the tube around the series of balls.

A further issue with pretensioners is the need to maintain the retractor and the seatbelt webbing in a locked condition at the end of the pretensioning stroke. When the retractor spool does not remain locked, payback can occur which allows the seatbelt to unspool and reintroduce slack in the seatbelt. One method for maintaining the locked position includes maintaining pressure from the gas generator beyond the amount needed for the pretensioning stroke. However, this adds weight and cost.

An alternative type of pretensioner replaces the metallic balls as the driving element. Instead of metallic balls, a flexible rod may be used as the driving element. The flexible rod may be made of a polymer and have an elongate shape. Different cross-sectional shapes of the polymer rod may be used. The polymer rod is driven in a similar manner to the metallic balls, with a gas generator producing a charge and an increase in pressure at one end, causing the rod to be propelled through a channel and into engagement with a sprocket or pinion. The pinion is operatively coupled to a spindle, such that when the rod engages with the pinion and rotates the pinion, the pinion will cause the spindle to rotate and take up seatbelt webbing.

Known pretensioner assemblies include multiple components that are assembled together to allow the pinion to rotate in response to actuation by the driving element and to further cause the spindle to rotate in response. For example, the assembly can include a tread head, a two-piece pinion, a bearing disc, a bending element, a torsion bar, and the spindle. The two-piece spindle and bending element are mounted to the tread head, and the bearing disc is mounted to one side of the spindle. The torsion bar is mounted at one end to the tread head and at its opposite end to the spindle. These assemblies can include issues with axial tolerance stackup as well as assembly time. Moreover, the need to transfer torque between assembled components requires attachment interfaces fixed against rotation, thereby resulting in outer circumferential surfaces that are jagged or include protrusions.

BRIEF SUMMARY

Seatbelt pretensioning retractor assemblies for use in a passenger vehicle are provided herein. In an exemplary embodiment, a pretensioning device for use in seat belt retractor assembly includes a rotatable spindle configured for taking up seat belt webbing in response to rotation of the spindle, wherein the spindle rotates about a central longitudinal axis; a tread head pinion operative coupled to the spindle, the tread head pinion configured to rotate in response to a pretensioning load applied thereto, wherein rotation of the tread head rotates the spindle; and a deformable rod configured to translate along a predetermined path into direct engagement with the tread head pinion in response to actuation of the rod, wherein the translation and engagement of the rod with the tread head pinion rotates the tread head pinion.

The tread head pinion may be formed as a single piece and includes: a first side facing away from the spindle and a second side facing toward the spindle; a ring portion extending between the first and second sides and having a plurality of radially protruding teeth for receiving the pretensioning load from the rod; a pair of flanges including a first flange at the first side and a second flange at the second side disposed on opposite sides of the teeth and projecting radially outward beyond the teeth, the flanges disposed longitudinally adjacent the plurality of teeth, wherein the teeth blend into the flanges to define a cavity between adjacent teeth and the flanges; and a bearing portion projecting axially from the second flange toward the spindle, the bearing portion defining a bearing surface against which the spindle will bear.

In another embodiment, a pretensioning device for use in seat belt retractor assembly includes a rotatable spindle configured for taking up seat belt webbing in response to rotation of the spindle, wherein the spindle rotates about a central longitudinal axis; a tread head pinion operative coupled to the spindle, the tread head pinion configured to rotate in response to a pretensioning load applied thereto, wherein rotation of the tread head rotates the spindle; and a deformable rod configured to translate along a predetermined path into direct engagement with the tread head pinion in response to actuation of the rod, wherein the translation and engagement of the rod with the tread head pinion rotates the tread head pinion The tread head pinion may be formed as a single piece and may include: a first side facing away from the spindle and a second side facing toward the spindle; a ring portion extending between the first and second sides and having a plurality of radially protruding teeth for receiving the pretensioning load from the rod; a pair of flanges including a first flange at the first side and a second flange at the second side disposed on opposite sides of the teeth and projecting radially outward beyond the teeth, the flanges disposed longitudinally adjacent the plurality of teeth, wherein the teeth blend into the flanges to define a cavity between adjacent teeth and the flanges. A torsion bar may extend into an inner cavity defined by the ring portion of the tread head pinion and may be attached to the tread head pinion at a first end and the spindle at a second end.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

FIG. 10A is a side cut-away view of the plastically deformable polymer rod and a stopper in accordance with an exemplary embodiment;

FIG. 10B is a side cut-away view of the plastically deformable polymer rod and the stopper in accordance with another exemplary embodiment;

It should be understood that throughout the drawings, corresponding reference numerals indicate like or corresponding parts and features.

DETAILED DESCRIPTION OF THE INVENTION

The following description is merely exemplary in nature and is not intended to limit the present disclosure or its application or uses.

Figure 1:
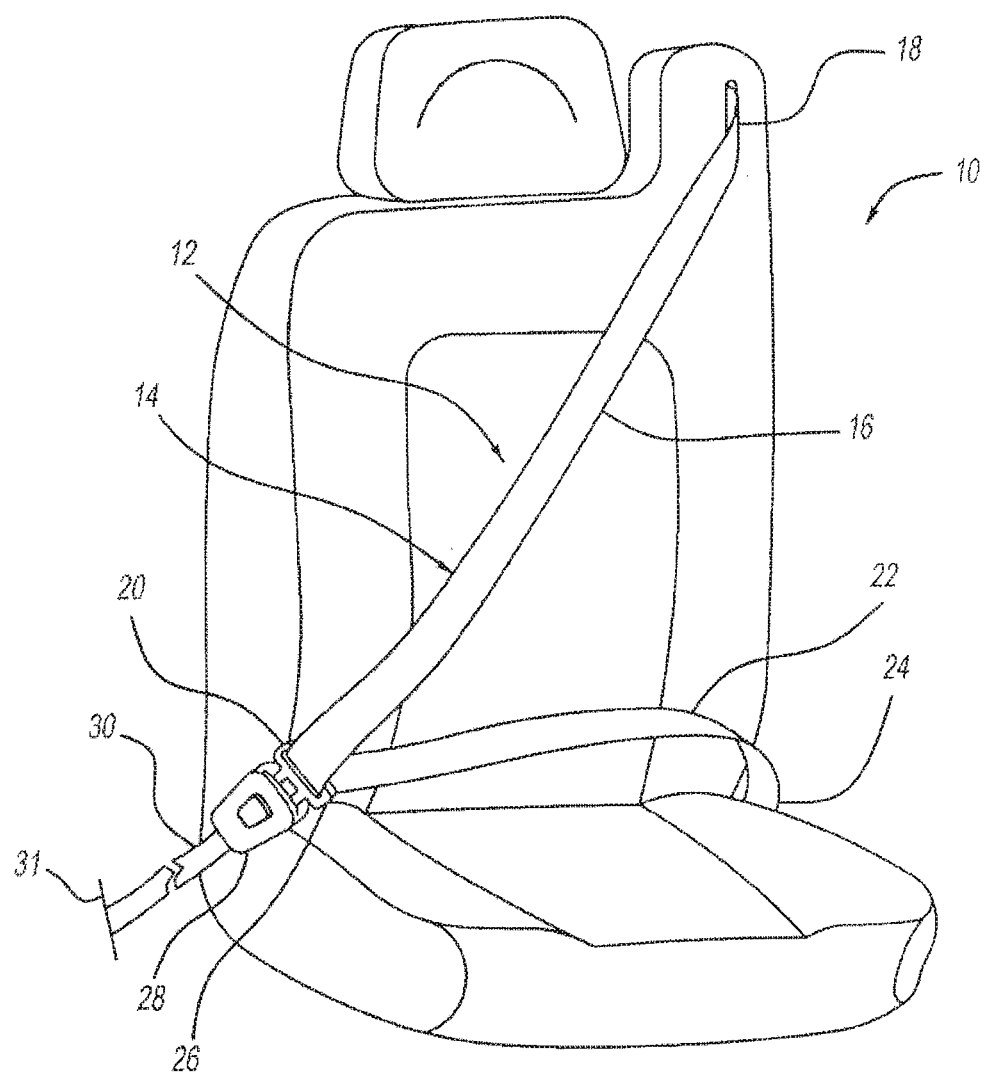
FIG. 1 is perspective view of an occupant restraint system in accordance with an exemplary embodiment.

Referring now to the drawings, FIG. 1 shows a vehicle seat 10 and a seatbelt assembly 12 in accordance with an exemplary embodiment. The seatbelt assembly 12 includes a seatbelt webbing 14 having a shoulder belt portion 16 extending from an upper guide loop or anchorage 18 to a latch plate 20 and a lap belt portion 22 extending from the latch plate 20 to an anchorage 24. The latch plate 20 can include a loop portion 26 through which the seatbelt webbing 14 extends. The latch plate 20 is able to be inserted into a seatbelt buckle 28 to lock and unlock the seatbelt assembly 12. A seatbelt buckle cable 30, either directly or in cooperation with other components, secures the seatbelt buckle 28 to a portion 31 of the vehicle structure (e.g., vehicle frame). It will be appreciated that other manners of attaching the seatbelt webbing 14 to vehicle could also be used, including variations on the latch plate 20 and the seatbelt buckle 28 and their attachments to the seatbelt webbing 14 and associated vehicle structure.

The seatbelt webbing 14 is able to pay-out from a seatbelt pretensioning retractor assembly or retractor assembly 32 (shown in FIGS. 2 and 3), which is located within the vehicle seat 10 (in an integrated structural seat design) or is coupled structurally to the vehicle body, so that the effective length of the seatbelt webbing 14 is adjustable. When the latch plate 20 has been fastened to the seatbelt buckle 28, the seatbelt assembly 12 defines a three-point restraint between the anchorage 18, the latch plate 20, and the anchorage 24. Any other suitable configurations, such as alternative locations for the retractor assembly 32, the latch plate 20, and the anchorage 24, may be used with the present invention.

Figure 2:
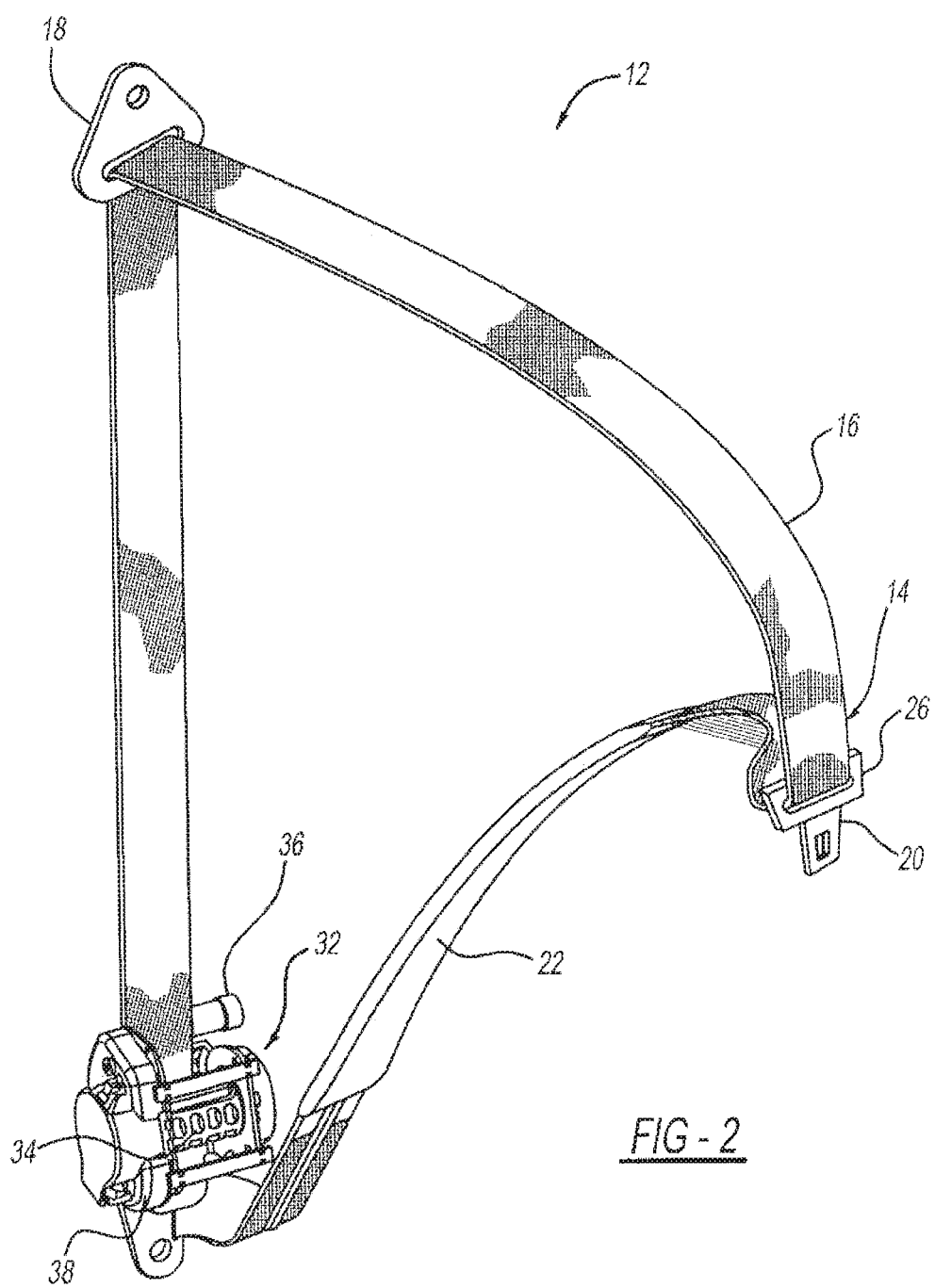
FIG. 2 is a perspective view of the occupant restraint system with various components removed to show a seatbelt pretensioning retractor assembly in accordance with an exemplary embodiment.

Now with reference to FIG. 2, an isometric view of the seatbelt assembly 12 is illustrated disassociated from the motor vehicle and showing the retractor assembly 32 in accordance with an exemplary embodiment. The retractor assembly 32 includes a spool assembly 34 and a gas generator 36 mounted to a common frame 38. The spool assembly 34 is connected with and stows the seatbelt webbing 14 of the shoulder belt portion 16, whereas the end of the lap belt portion 22 of the seatbelt webbing 14 is fixedly engaged with the anchorage point, for example, the frame 38 or another portion of the motor vehicle such as the seat 10 (shown in FIG. 1) or floor pan.

Figure 3:
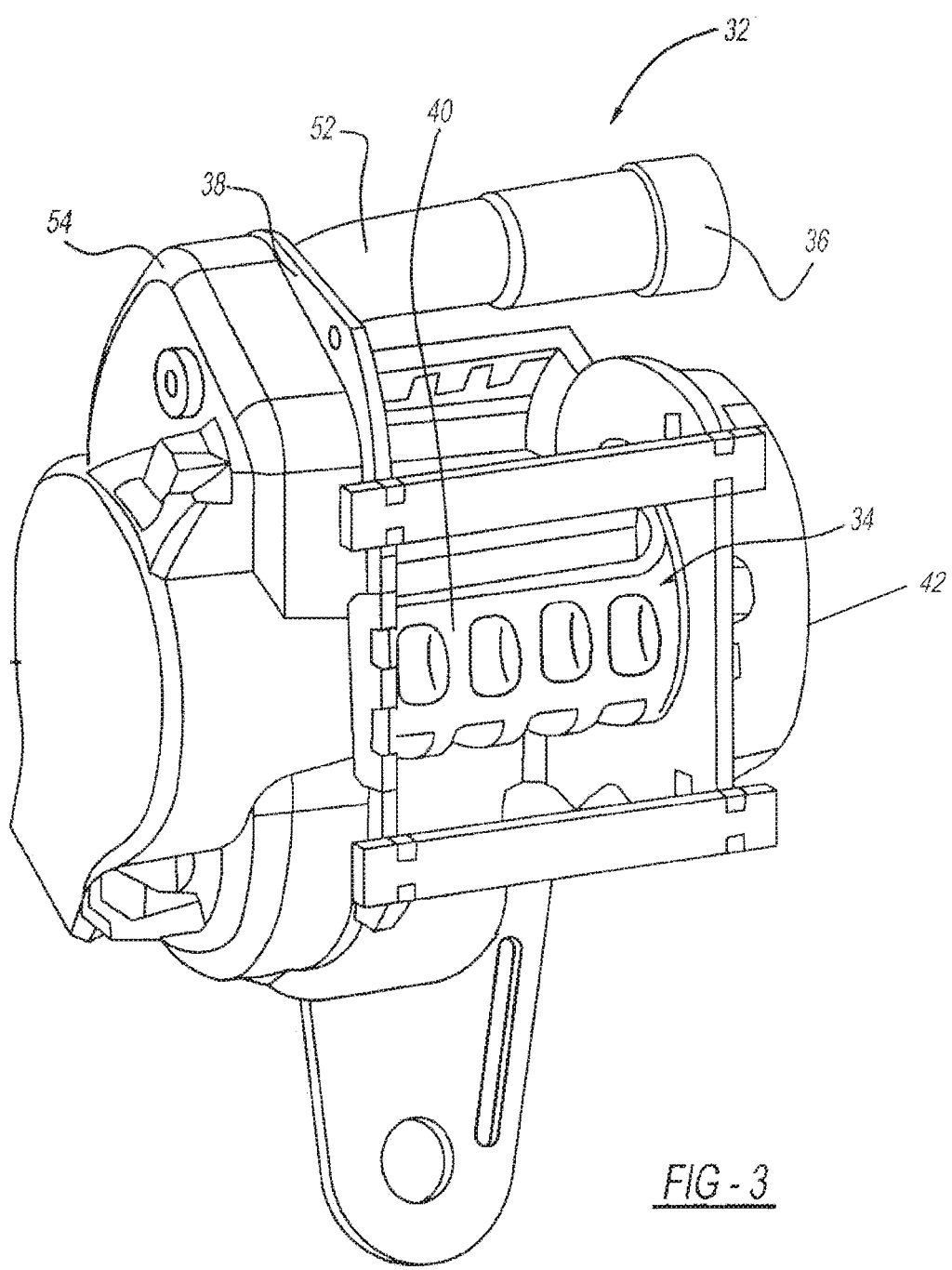
FIG. 3 is a perspective view of the seatbelt pretensioning retractor assembly in accordance with an exemplary embodiment.

Referring also to FIG. 3, the spool assembly 34 includes a belt spool or spindle 40 that engages the shoulder belt portion 16 of the seatbelt webbing 14 and rotates to wind-up or pay-out the seatbelt webbing 14. A torsional "clock" or "motor" type spring is carried within a spring end cap 42 and rotationally biases the belt spool 40 to retract the seatbelt webbing 14. The spool assembly 34 may further incorporate other spool control mechanisms that are known in accordance with the prior art, including pretensioners, inertia and webbing sensitive locking devices, torsion bar load limiters, or other belt control devices, some of which will be described in further detail below. "Spool control systems" referred to in this specification may include any system that controls the rotational movement of a webbing spool, thus controlling the extraction and retraction of seatbelt webbing. One such spool control system is a motor-assisted retractor. Spool locking devices typically incorporate an inertia sensitive element, such as a rolling ball or pendulum, and cause a sprocket of the spool to be engaged to prevent further withdrawing of the seatbelt webbing 14 from the belt spool 40. Webbing sensitive locking devices sense rapid pay-out of seatbelt webbing 14 to lock the retractor assembly 32. Various electronic sensing mechanisms that detect the withdrawal of seatbelt webbing 14 and/or the connection of the latch plate 20 to the seatbelt buckle 28 may also be incorporated into the retractor assembly 32.

During normal operation of the vehicle, the retractor assembly 32 allows pay-out of seatbelt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate or if the brakes are actuated with a predetermined force, then the retractor assembly 32 is locked. Due in part to the free pay-out of the seatbelt webbing 14, the seatbelt assembly 12 often develops slack during normal use.

Figure 4:
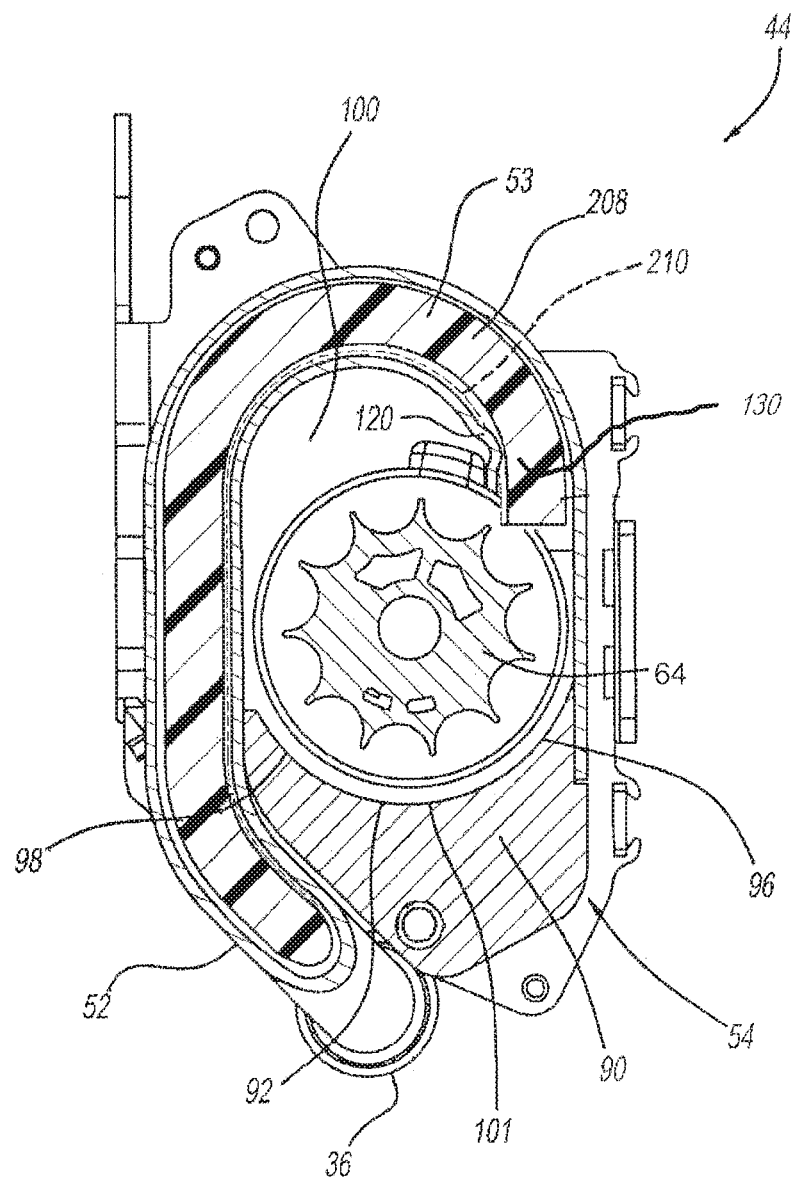
FIG. 4 is a cut-away view of the seatbelt pretensioning retractor assembly illustrating a tube, a plastically deformable polymer rod, and a tread head pinion in a non-actuated position in accordance with an exemplary embodiment.

FIG. 4 provides a cut-away illustration of a pretensioner system 44 in accordance with an exemplary embodiment. Referring to FIGS. 3-4, in particular, the retractor assembly 32 further incorporates the pretensioner system 44 operatively connected to the spool assembly 34 and operable to rotate the belt spool 40 for pretensioning. As known to those of skill in the art, a retractor pretensioner winds seatbelt webbing into a more taught condition against the occupant at the initial stages of a detected vehicle impact. This is provided to reduce forward motion or excursion of the occupant in response to the deceleration forces of a vehicle impact or rollover.

The pretensioner system 44 includes a pretensioner tube 52 in communication with the gas generator 36. The gas generator 36 is used to provide expanding gas in response to a firing signal. As is known in the art, for example, the vehicle includes a sensor array sending a signal indicative of an emergency event such as an impact event, crash, or rollover. The vehicle sensor may be a specific impact sensor, or may be a traditional vehicle sensor (e.g. a longitudinal or lateral acceleration sensor) or otherwise part of a control system having a suite of multiple sensors. Any other impact sensor that is or will be known to those skilled in the art may also be readily employed in conjunction with the seatbelt assembly 12 of present invention. An electronic control unit such as a central processing unit (CPU) or other controller receives a signal and controls the seatbelt assembly 12 to respond by tightening the seatbelt webbing 14 of the vehicle (e.g. via activation of a pretensioner).

As will be discussed in further detail below, the pretensioner tube 52 has a pretensioner rod 53, e.g., a plastically deformable polymer rod, disposed therein that has an elongate shape and is flexible within the tube 52. More specifically and as will be discussed in further detail below, the pretensioner rod 53, when disposed outside of the pretensioner tube 52 prior to insertion therein, has a generally straight shape, and when inserted into the tube 52 it will bend and flex in accordance with the tortuous shape of the tube 52.

In normal use, the spool assembly 34 will rotate relative to the common frame 38 to wind the seatbelt webbing 14 attached to the spool assembly 34. The common frame 38 includes a housing 54 for housing the components of the pretensioner system 44.

Figure 5A:
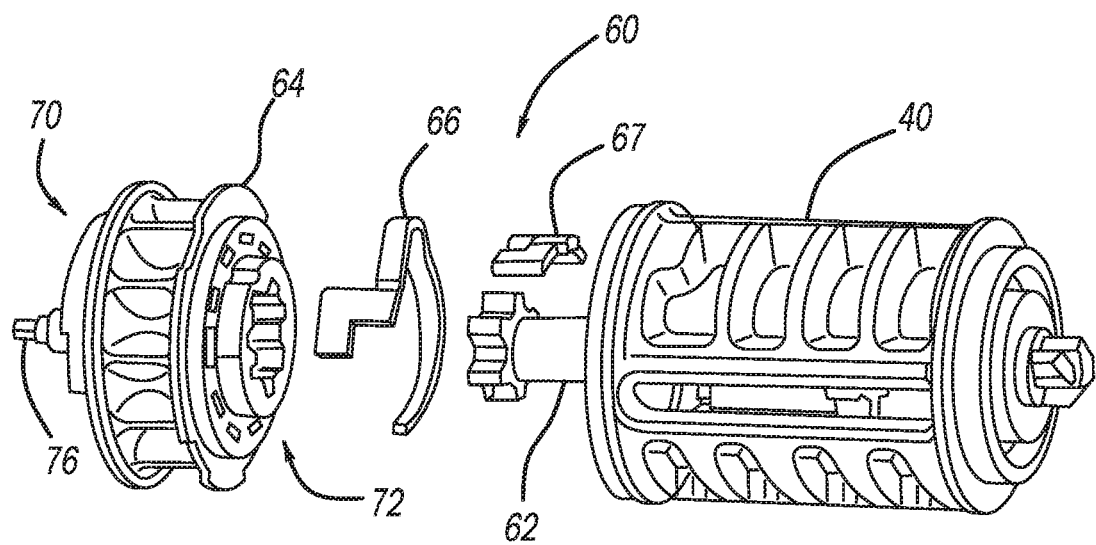
FIG. 5a is an exploded view of a pretensioning assembly including the tread head pinion, a bending element, a bending element insert, a torsion bar, and a spindle.
Figure 5B:
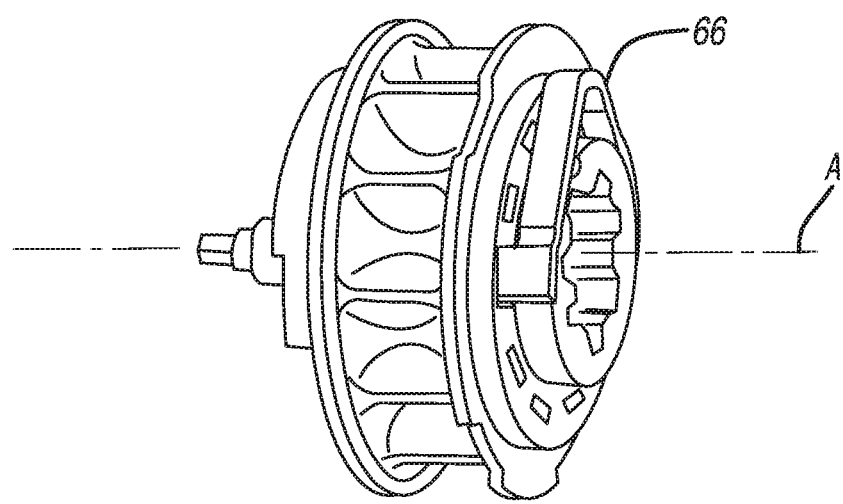
FIG. 5B illustrates the bending element staked to the tread head pinion.

With reference to FIGS. 5A and 5B, the pretensioner system 44 includes a pretensioner assembly 60 that may include the spool or spindle 40, a torsion bar 62, a tread head pinion 64, and a bending element 66. As further described below, the tread head pinion 64 may include numerous features previously contained in separate assembled parts. FIG. 5A illustrates an exploded view, and the tread head pinion 64 is arranged to attach directly to the torsion bar 62 (which is inserted into the tread head pinion 64), and the torsion bar 62 is also arranged to attach directly to the spindle 40 (inside the spindle; not shown). The bending element 66, which may be a digressive bending element, attaches to both the tread head pinion 64 and the spindle 40. The bending element 66 may attach to the spindle 40 via a bending element insert 67. When assembled, the spindle 40 bears against the tread head pinion 64, allowing the spindle 40 to rotate relative to the tread head pinion 64 if necessary during the pretensioning. FIG. 5B illustrates the bending element 66 attached to the tread head pinion 64.

The torsion bar 62 and bending element 66 operate in a manner known in the art, which allows for the load imparted on the passenger during pretensioning to be tailored. For example, the torsion bar 62 may twist in response to a load on the seatbelt and spindle exceeding a predetermined level, thereby allowing some payout of the seatbelt webbing by allowing the torsion bar 62 and spindle to twist relative to the pretensioned and locked tread head pinion 64. The payout that occurs reduces the load on the passenger relative to a fully locked belt.

Figure 6:
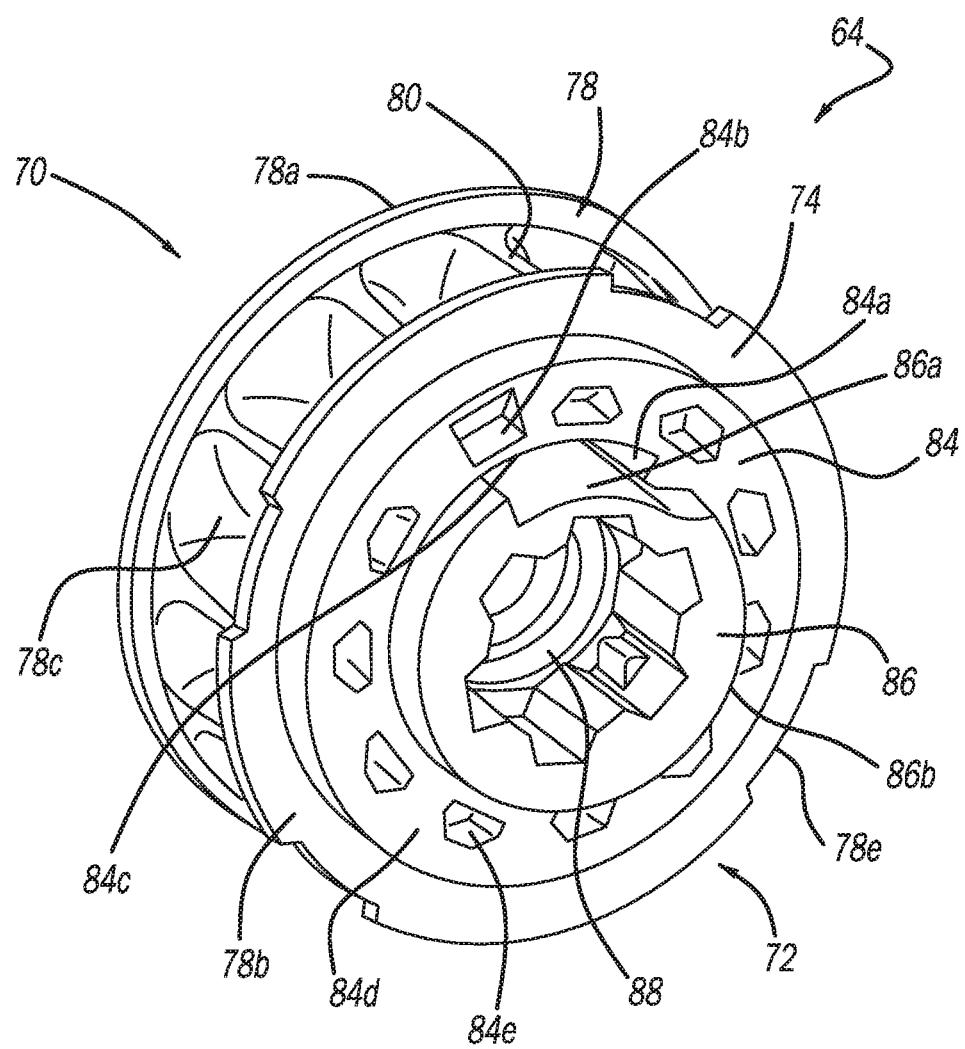
FIG. 6 is a perspective view of the tread head pinion.
Figure 7:
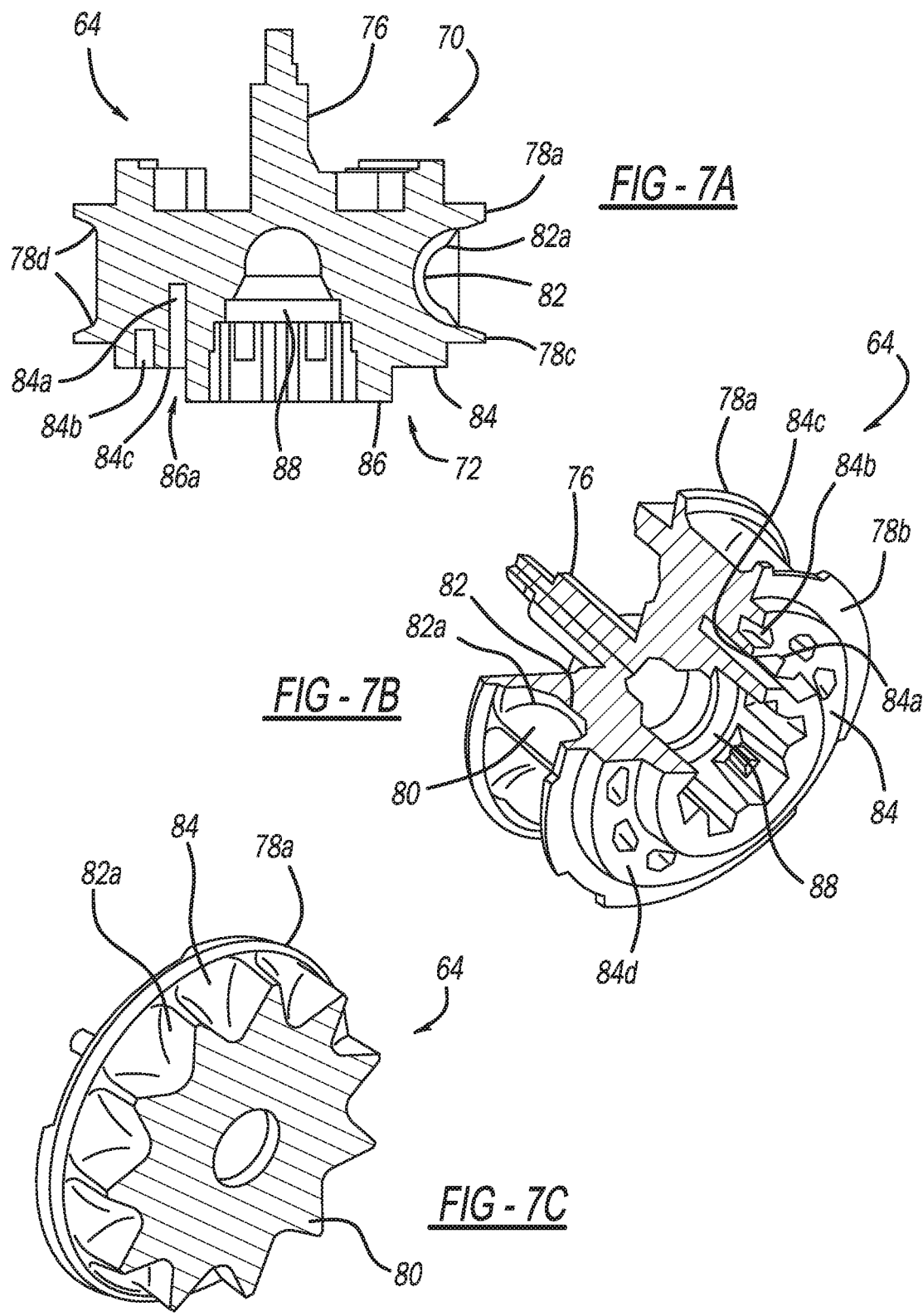
FIG. 7A is a cross-sectional view of the tread head pinion.
FIG. 7B is a partial cut-away perspective view of the tread head pinion.
FIG. 7C is a perspective cut-away view of the tread head pinion.

With reference to FIGS. 5A-6, the tread head pinion 64 is formed as a single piece. The pinion 64 may be formed by sintering or die-casting and made from zinc or aluminum. The tread head pinion 64 may be described herein with reference to various portions or features of the one-piece design. It will be appreciated that references to various portions or features are intended to refer to a portion or feature of the single piece design of the tread head pinion 64.

The tread head pinion 64 has a generally circular profile, such that the tread head pinion 64 may rotate generally along with the spindle (although some relative rotation between the tread head pinion 64 and the spindle is possible depending on deformation of the torsion bar 62 during periods of high loading). The tread head pinion 64 may also be described as having a disc-like shape, with a first side 70 facing a first direction and a second side 72 facing a second direction that is opposite the first direction. The pinion 64 may also include a body portion 74 extending axially between the first and second sides. The tread head pinion 64 has a central axis A about which the tread head pinion 64 will rotate with the spindle.

The first side 70 is disposed axially farther away from the spindle 40 than the second side 72. Put another way, the first side 70 faces away from the spindle 40, with the second side 72 facing the spindle 40. The second side 72 is arranged to engage the spindle 40 when assembled.

The first side 70 may include various structure corresponding to the traditional function of a seatbelt spool assembly, such as the structure that cooperates with the inertia lock. The first side 70 may include a shaft portion 76 that projects axially outward from the first side 70. The shaft portion 76 is arranged to cooperate with the frame or assembly housing or other structure to allow the tread head pinion 64 to rotate during web payout or pay in under normal operating conditions, and allows the tread head pinion 64 to rotate in response to pretensioning to take up seat belt webbing.

The body 74 of the tread head pinion 64 is arranged to receive the driving element of the pretensioning assembly. The driving element may be in the form of the polymer rod 53 that is driven through the tube 52 and into engagement with a radially outer portion of the tread head pinion 64. With the polymer rod 53 engaging with a radially outer portion of the pinion 64, the pinion 64 will be rotated in response to the driving force of the polymer rod 53. The use of the polymer rod 53 as the driving element is described herein, but it will be appreciated that aspects of the one-piece tread head 64 may also be used with other types of driving elements.

With reference to FIG. 6 and FIGS. 7A-7C, the body 74 includes a driving element receiving ring portion 78 extending circumferentially around the radially outer edge of the body 74 and defining the radially outer surfaces of the tread head pinion 64. The ring portion 78 includes a first flange 78a and a second flange 78b. The first flange 78a is disposed adjacent the first side 70, and the second flange 78b is disposed adjacent the second side 72.

The flanges 78a and 78b extend radially outward from the central axis A and define an inner space 78c axially between the first flange 78a and the second flange 78b. The space 78c between the flanges 78a 78b is designed to receive the polymer rod 53 or other driving element that is driven into engagement with the tread head pinion 64 during pretensioning.

The flanges 78a and 78b therefore have an inner surface and an outer surface, with the inner surfaces facing the inner space 78c, and the outer surfaces facing axially outward.

The flanges 78a and 78b may include a chamfered inner edge 78d at the radially outer inner corner of the flanges 78a and 78b. This chamfered edge 78d may operate to guide the driving element or polymer rod 53 into the inner space 78c during pretensioning. Thus, the chamfered edge 78d preferably extends circumferentially around the entire perimeter of the flanges 78a and 78b. One or both of the flanges 78a and 78b may include radially outer notches 78e extending into the flanges 78a and 78b.

The ring 78 further includes a plurality of teeth 80 that extend between the flanges 78a and 78b in the inner space 78c. The teeth 80 are designed to engage with the driving element 53, such that when the driving element 53 is driven during pretensioning, the driving element will impact on the teeth 80, causing the tread head pinion 64 and attached spindle 40 to rotate. The teeth 80 are preferably evenly spaced circumferentially around the ring 78.

Figure 8:
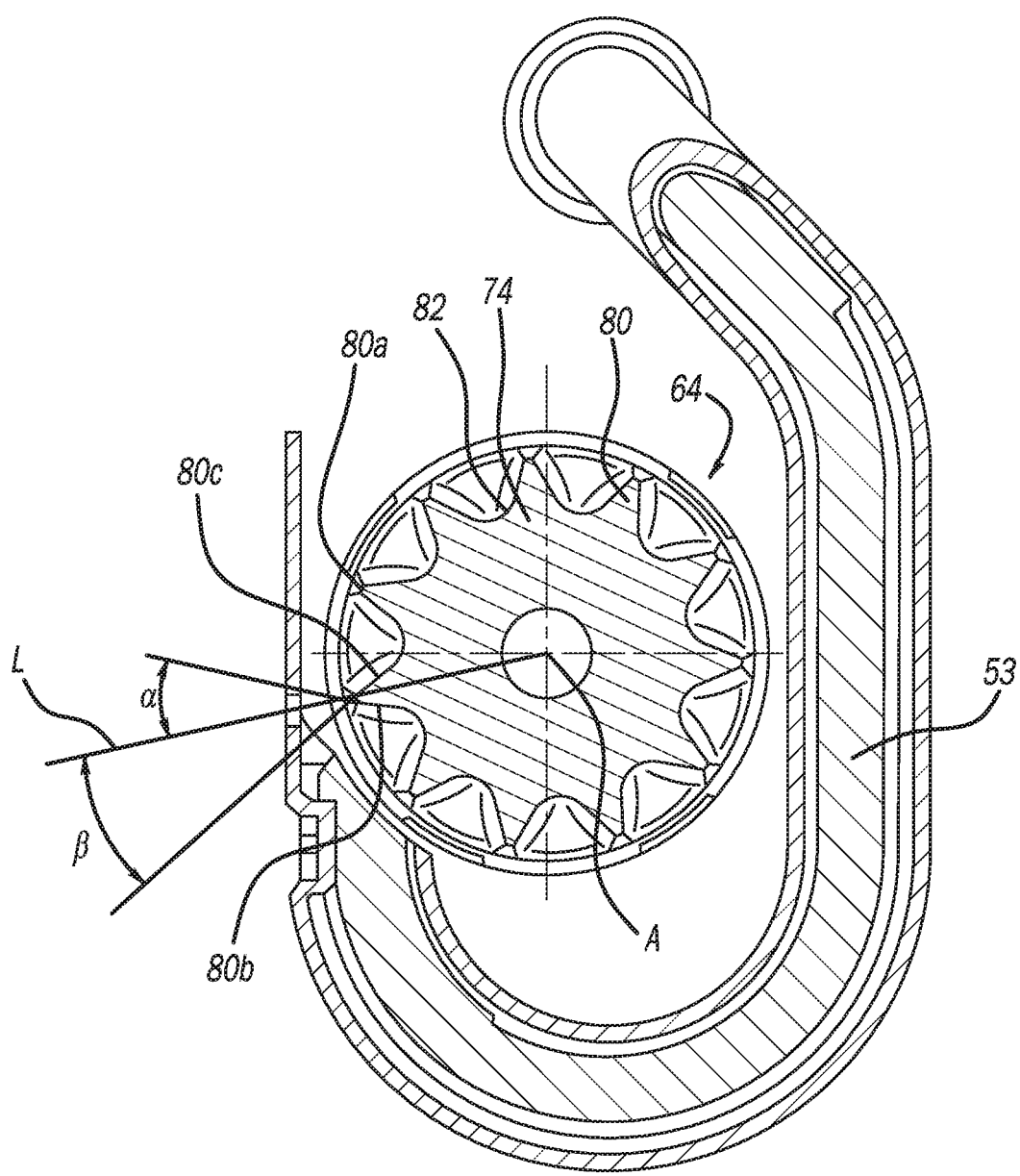
FIG. 8 is a cut-away view of the tread head pinion and a deformable polymer rod.

In one form, and with further reference to FIG. 8, when viewing a cross-section of the teeth 80 in the axial direction, the teeth 80 each have a radially outer apex 80a, a first face 80b, and a second face 80c. The first face 80b and second face 80c may be arranged at different angles relative to the apex and the central axis A.

For example, in one approach, with reference to a line L extending from the axis A through the apex 80a of one of the teeth 80, the first face 80b is arranged at an angle α from the reference line, and the second face 80c is arranged at an angle β from the reference line, such that a is less than or equal to β. In one preferred example, the angle α is less than the angle β. In one example, the angle α can be approximately 25 degrees and the angle β can be approximately 30 degrees.

The first face 80b is preferably disposed at the side of the tooth 80 that faces the driving element 53, such that when the driving element 53 is driven into engagement with the teeth 80, the driving element will impact on the first face 80b. The reduced angle of the first face 80b increases the ratio of pinion tangential force to radial force when the driving element 53 begins pushing on the tread head pinion 64.

The ring 78 may also include a base surface 82 that is disposed radially inward from the apex 80a of the teeth 80. The base surface 82 may define the base of each of the teeth 80. The intersections between the teeth 80, the flanges 78a and 78b, and the base surface 82 may be in the form of fillets 82a, thereby defining a plurality of curved pockets 84 within the inner space 78c. The fillets 82a thereby take up part of the inner space 78c, which reduces the ability of the polymer rod to deform into the space near the intersections of the teeth 80, flange 78a/b, and base surface 82. Excessive rod deformation wastes energy, so the reduction in space into which the rod 53 can deform reduces the amount of potential wasted energy.

With reference again to FIGS. 6, 7A, and 7B, the second side 72 of the tread head pinion 64 includes the structure that attaches to the torsion bar 62 and the bending element 66, as well as providing the bearing surface for the spindle 40. The second side 72 includes a spindle bearing portion 84 that extends axially outward away from the second flange 78b. The bearing portion 84 has a generally circular profile and forms a stepped surface extending from the body 74 and the second flange 78b. The bearing portion 84 has an outer diameter that is smaller than the outer diameter of the second flange 78b, such that the second flange 78b extends radially outward relative to the bearing portion 84.

A bending element mounting portion 86 extends axially outward from the bearing portion 84. The bending element mounting portion 86 has a generally circular profile with an outer diameter that is smaller than the outer diameter of the bearing portion 84, such that the bearing portion 84 extends radially outward from the bending element mounting portion 86.

The bending element mounting portion 86, the bearing portion 84, and the body 74 of the one-piece tread head pinion 64 combine to define an inner cavity 88 extending axially inward into the tread head pinion 64 from the axial outer surface of the bearing element mounting portion 86. The cavity 88 is centered on the axis A, and has a splined profile when viewed axially. The splined shape of the cavity 88 corresponds to an end shape of the torsion bar 62, such that the torsion bar 62 may be inserted axially into the cavity 88 and fixed rotationally relative to the tread head pinion 64. The splined profiles of the cavity 88 and the torsion bar 62 operate to transfer torque between the tread head pinion 64 and the torsion bar 62.

The bending element mounting portion 86 includes a notch 86*a* that extends radially inward from an outer circumferential surface of the bending element mounting portion 86. The notch 86*a* provides a pocket or a space in which an end portion of the bending element 66 may be disposed.

The bearing portion 84 similarly includes a staking pocket 84*a* disposed axially adjacent the notch 86*a*, such that the open space of the notch 86*a* communicates with the pocket 84*a*. The pocket 84*a* extends axially inward into the bearing portion 84.

Thus, the end of the bending element 66 may be inserted axially into the notch 86*a* and the pocket 84*a*. The bearing portion 84 also includes an access cavity 84*b* extending axially inward into the bearing element at a location disposed radially adjacent and outward from the staking pocket 84*a*. Thus, a staking wall 84*c* is defined between the pocket 84*a* and the cavity 84*b*. The staking wall 84*c* is deformable in a radial direction to stake the end of the bending element 66 (which is inserted into the pocket 84*a*) to the tread head pinion 64.

The bending element mounting portion 86 has a continuously smooth outer circumferential surface over a majority of the circumference. The outer circumferential surface therefore has a generally constant diameter around the majority of the circumference, except for the area where the notch 86*a* is located.

Figure 9A:
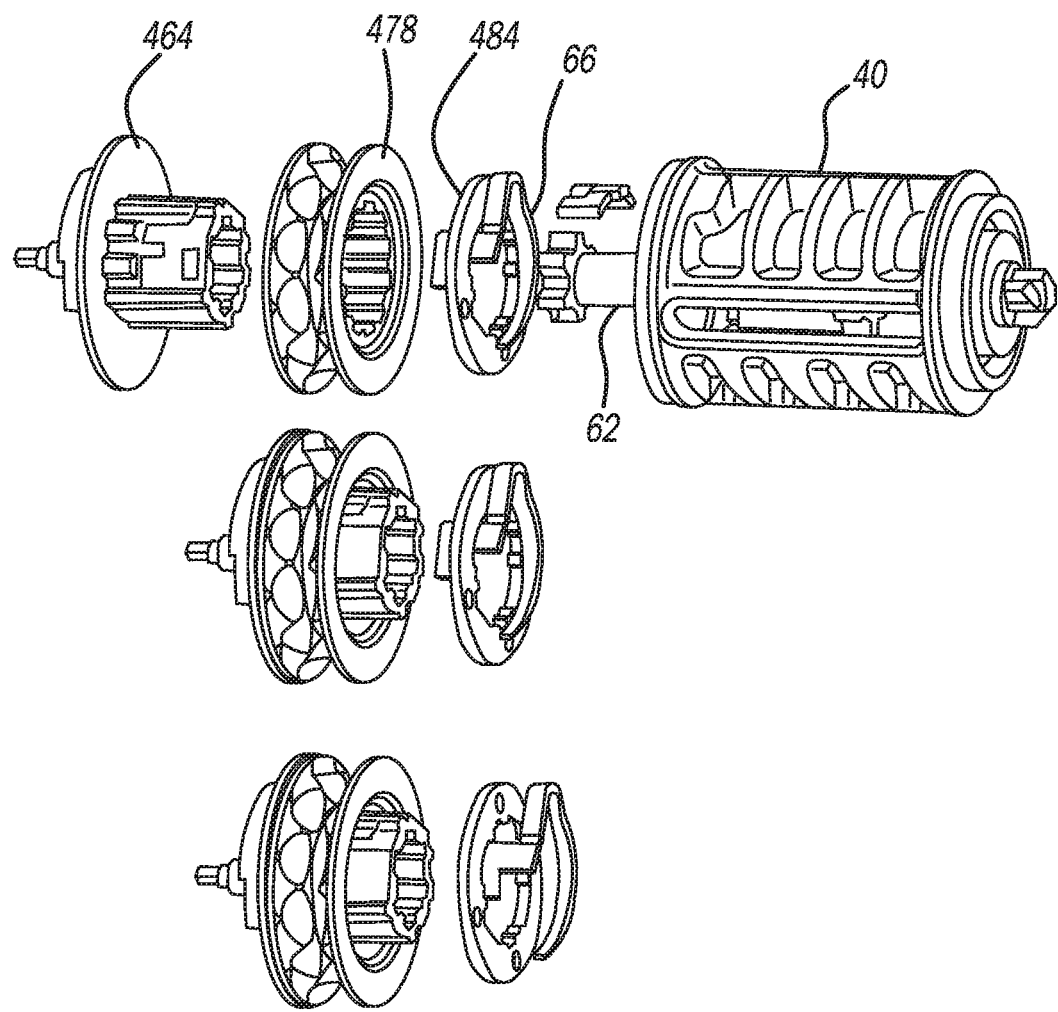
FIG. 9A illustrates a prior art multiple piece assembly of pretensioner components.

With reference to FIG. 9A, prior tread head designs required a splined outer surface of the tread head 464 where the bending element 66 would wrap around it. This was due to the tread head 464 and pinion 478 being separate pieces. The pinon 478 included a splined inner opening that cooperated with the splined outer surface of the tread head 464, such that the pinion 478 could be assembled with the tread head 464 and that torque from the pinion 478 would be transferred to the tread head 464. The splined portion of the tread head 464 extended through the pinion 478 and projected outward, with the portion projecting beyond the pinion 478 being the portion that the bending element 66 wrapped around. This portion of the tread head 464 is required to be splined because the splined pinion 478 needed to pass over it during assembly.

As shown in FIG. 6, the bending element 66 is provided with a smooth circumferential bearing surface 86*b* around the bending element mounting portion 86 rather than a splined bearing surface.

Additionally, as described above the bearing portion 84 extends axially outward from the flange 78*b*. The bearing portion 84 provides a bearing surface 84*d* against which the spindle 40 can bear as the spindle 40 rotates relative to the pinion 64. In normal operation of the retractor, the spindle 40 does not rotate relative to the tread head 64. However when the torsion bar 62 twists in response to a load on the seatbelt webbing, the spindle 40 rotates relative to the tread head 64, and will bear against the bearing portion 84.

The bearing surface 84*d* has a generally annular shape that surrounds the bending element mounting portion 86. The above described cavity 84*a* for staking the bending element 66 extends axially into the bearing surface 84*d*. In addition to the cavity 84*a*, the bearing portion 84 may further include a plurality of core outs 84*e*. The core outs 84*e* are in the form of cavities or other holes formed in the bearing surface 84*d*. The core outs 84*e* reduce the overall weight of the tread head 64, and the one-piece form of the tread head 64 allows the bearing surface 84*d* to remain robust.

In prior art designs, as shown in FIG. 9A, a separate bearing disc 484 was placed against the pinion 478 between the pinion 478 and the spindle 40. The bearing disc 484 would include an internal opening with a splined inner profile such that the bearing disc 484 would fit over the splined tread head 464, similar to the pinion 478. The bearing disc 484 also included a notch in the inner profile to hold the bending element 66 in place. The bending element 66 would be engaged with the bearing disc 484, and then the bearing disc 484 and bending element 66 would be placed over the splined portion of the tread head 464.

The above described approach does not include a separate bearing disc, and the bending element 66 may simply be inserted into the notch 86*a* and cavity 84*a* and staked by deforming the wall 84*c*.

Figure 9B:
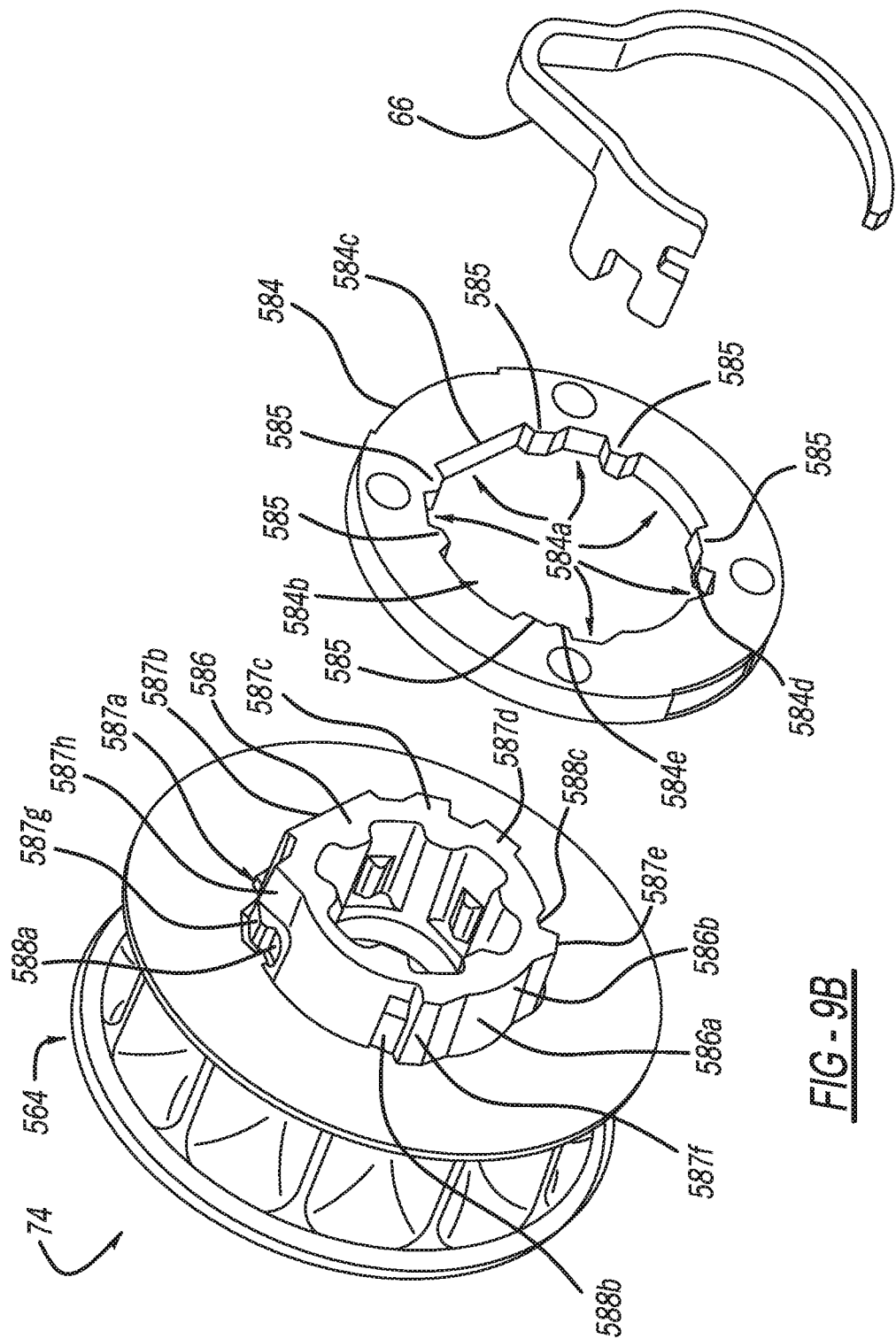
FIG. 9B illustrates an alternative tread head pinion.

In an alternative approach, as shown in FIG. 9B, an alternative tread head 564 may be arranged to receive a separate bearing disc 584. In this approach, the one-piece construction may include the body 74 and an alternative version of a bending element mounting portion 586. The bearing disc 584 is sized and arranged to be disposed over the bending element mounting portion 586.

When assembled, the bearing disc 584 will be held in place rotationally on the bending element mounting portion 586 due to corresponding notches and protrusions that extend radially inward and outward on the bearing disc 584 and the bending element mounting portion 586. The bending element mounting portion 586 includes an axially inner portion 586*a* and an axially outer portion 586*b* relative to the body 74. The inner portion 586*a* has an outer profile configured to engage with an inner profile of the bearing disc 584. The outer portion 586*b* is configured to engage with the bending element 66 as it bends.

The bending element portion 586 includes protrusions 587*a, b, c, d, e*, and *f* disposed around the outer profile of the bearing element portion 586. Protrusion 587*a* has an inner portion 587*g* and an outer portion 587*h*, where the inner portion 587*g* has a trapezoidal shape and the outer portion 587*h* has a pointed shape. The inner portion 587*g* engages the bearing disc 584, and the outer portion 587*h* engages the bending element 66.

The protrusion 587*b* has an elongated box shape with a radially outer flat surface. The protrusions 587*c, d, e*, and *f* have box or trapezoidal shapes. It will be appreciated that other shapes of the protrusions 587 could also be used.

The bending element mounting portion 586 may also include radial depressions in the outer surface. Depression 588*a* is disposed circumferentially adjacent protrusion 587*a*, and depression 588*b* is disposed circumferentially adjacent protrusion 586*f*. Depression 588*c* is disposed circumferentially adjacent protrusion 586*e*.

The bearing disc 584 has recesses 584*a* that correspond to the protrusions 586*a, b, c, d, e*, and *f* of the bending element mounting portion 586, and a recess 584*b* for receiving the bending element 66. The recesses are defined by projections 585 that extend radially inward from the inner profile of the bearing disc 584. The bearing disc 584 defines a flat surface 584*c* that corresponds to protrusion 586*b*. The bearing disc 584 may include a nub 584*d* disposed on one of the projections 585, and another nub 584*e* disposed on another of the projections 585. The nub 584*d* corresponds to the depression 588*c* and the nub 584*e* corresponds to the depression 588*b*.

The bending element 66 may be disposed on the bending element mounting portion 586, with the bearing disc 584 covering a portion of the bending element 66 at the recess 584*b* to hold the bending element 66 between the bending element mounting portion 586 and the bearing disc 584. The bearing disc 584 provides the bearing surface described above, and the bending element 66 will wrap around the bending element mounting portion 586 similar to manner described above.

The one-piece form of the tread head 64 or the tread head 564 (relative to a multi piece assembly of FIG. 9A that assembles the tread head 464, pinion 478, and bearing disc 484), allows the depth of the space 78*c* between the pinion teeth 80 to be greater, or provides additional structural stability relative to the separate pinion 478. In the multi-piece design, the depth between the pinion teeth was limited because the pinion 478 had to pass over the splined projection of the tread head 464. Thus, the base of the space between the pinion teeth would always be radially outside of the outermost surface of the splined projection of the tread head 464, because the separate pinion 478 passed over the splined projection. The outermost surface of the tread head 464 projection beyond the bearing disc 484 also acted as the surface around which the bending element 66 would wrap.

In the one-piece design, the depth of the space 78*c* between the teeth 80 can extend into the body of the tread head 64 or tread head 564 radially inward of the outermost surface of the bending element mounting portion 86. This is not possible in the prior multi-piece design.

The use of a one-piece design relative to a multi-piece design also provides manufacturing advantages. The tread head 64 or 564 may be die-cast, sintered, or injection molded. The use of a one-piece design also reduces the overall tolerance band in the axial direction relative to the multi-piece design.

The one-piece tread head pinion 64 or 564 therefore combines with the spindle 40 as part of the spool assembly 34. The spool assembly 34 cooperates with the other components of the retractor assembly 32, which includes the components for pretensioning, as well as the components for normal operation of the retractor.

The spool assembly 34 includes the tread head pinion 64/564 that is disposed within the housing 54. The pinon 64/564 is attached to the belt spool 40. Rotation of the pinion 64/564 will cause the attached belt spool 40 to rotate to wind the seatbelt webbing 14 that is attached to the belt spool 40.

Figure 10C:
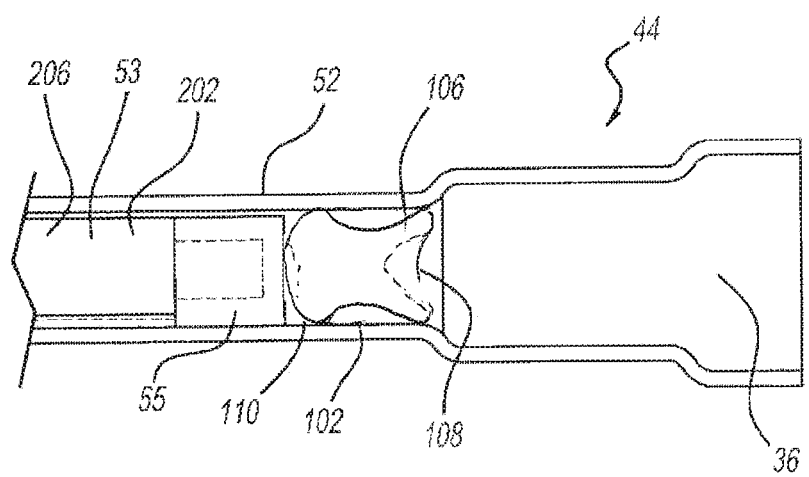
FIG. 10C is a cross-sectional view of a gas generator, a seal, the stopper, and the plastically deformable polymer rod of the seatbelt pretensioning retractor assembly in the non-actuated position in accordance with an exemplary embodiment.
Figure 12:
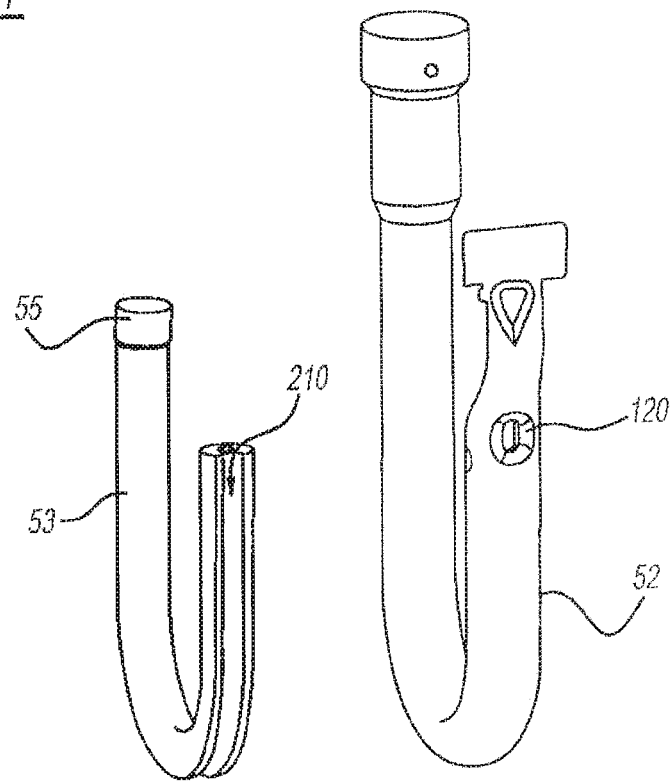
FIG. 12 is a partial exploded perspective view of the tube, the plastically deformable polymer rod, and the stopper in accordance with an exemplary embodiment.

FIG. 10A provides a side cut-away illustration of the pretensioner rod 53 and a stopper 55 in accordance with an exemplary embodiment. As shown in FIG. 10A, the pretensioner rod 53 has a generally circular cross-section in one form. In another approach, the pretensioner rod 53 could have a non-circular cross-section, such as a generally rectangular cross-section, generally triangular cross-section, or other polygonal cross-section that allows the pretensioner rod 53 to be inserted into the pretensioner tube 52 (shown in FIG. 4) and adapt to the tortuous shape of the pretensioner tube 52 when inserted. For purposes of discussion, the pretensioner rod 53 will be discussed as having a generally circular cross-section As illustrated and as discussed above, the pretensioner rod 53, when disposed outside of the pretensioner tube 52, has a generally straight shape and extends in a longitudinal direction 200 from a proximal end portion 202 to a distal end portion 204. The proximal end portion 202 is disposed towards the gas generator 36 (shown in FIG. 10C) when the pretensioner rod 53 is installed within the pretensioner system 44. In an exemplary embodiment, the pretensioner rod 53 has a cross-section that varies along its length to define a non-recessed portion 206 and a recessed portion 208 that defines a recess 210. In one example and as illustrated in FIGS. 10A and 12, the recess 210 is configured as a groove, e.g., U-shaped groove with sidewalls.

Referring to FIG. 10A, in an exemplary embodiment, the recessed portion 208 extends along a majority of the overall length of the pretensioner rod 53 from the proximal end portion 202 to and including the distal end portion 204. As illustrated, the proximal end portion 202 includes the non-recessed portion 206 in which the recess 210 terminates at a distal-most section of the non-recessed portion 206. As will be discussed in further detail below and as illustrated in FIG. 10A, the non-recessed portion 206 of the pretensioner rod 53 has a diameter, cross-sectional dimension, and/or perimeter greater than the recessed portion 208. In an exemplary embodiment, the non-recessed portion 206 has a length L1 of from about 15 to about 25 mm, such as about 20 mm and a width W1 of from about 4 to about 7 mm, and the recessed portion 208 has a length L2 of from about 60 to about 145 mm and a thickness W2 of from about 2.5 to about 8.0 mm.

In an exemplary embodiment, the pretensioner rod 53 also includes a positive feature 216, e.g., nub or post, extending proximally from the proximal end portion 202. The stopper 55 has a negative feature 218 formed therein that receives the positive feature 216 to couple the stopper 55 to the proximal end portion 202 of the pretensioner rod 53. In one example, the negative feature 218 and the positive feature 216 are sized such that the stopper 55 is compression fit, e.g., interference fit, onto the positive feature 216 to fixedly couple the stopper 55 to the pretensioner rod 53. Other forms of coupling and/or fixing the stopper 55 to the positive feature 216 and/or the proximal end portion 202 may be used, such as, for example, an adhesive, mechanical means, or the like. As illustrated in FIG. 10A, the positive feature 218 can be configured as a blind hole 220. Alternatively and as illustrated in FIG. 10B, the negative feature 220 can be configured as a through-hole 222 with the positive feature 216 extending partially or fully therethrough.

In an exemplary embodiment, the pretensioner rod 53 is made from a polymer material, which has a reduced weight relative to metallic ball driving elements of other roto-pretensioners. The particular polymer material can be selected to fit the particular desires of the user. The polymer material is preferably one that has sufficient flexibility such that it can bend and flex through the pretensioner tube 52 to allow for initial installation as well as in response to actuation by the gas generator 36. The polymer material is preferably one that has sufficient pushability in response to actuation, such that the pretensioner rod 53 will sufficiently transfer a load to a tread head pinion 64 of the pretensioner system 44, thereby functioning as a driving element for causing pretensioning.

Further, in an exemplary embodiment, the pretensioner rod 53 is made from a polymer material that is plastically deformable. During and after actuation, the pretensioner rod 53 will be become plastically deformed in response to actuation and contact with other components (e.g., the tread head pinion 64) of the pretensioner system 44. As will be discussed in further detail below, this plastic deformation will cause the pretensioner rod 53 to become locked, for example, in the tread head pinion 64 to prevent or limit payback of the pretensioner rod 53 without being completely dependent on maintained pressure in the system.

In one approach, the pretensioner rod 53 is made from a nylon thermoplastic material. The pretensioner rod 53 could also be made from a aliphatic polyamide thermoplastic material. In another approach, the pretensioner rod 53 could be made from a similar thermoplastic material, such as an acetal material or polypropylene material.

With reference once again to FIG. 4, the housing 54 further include a guide portion 90. The guide portion 90 is disposed within the housing 54 similar to the tread head pinion 64. More particularly, the guide portion 90 is disposed opposite the exit of the tube 52, and the tread head pinion 64 is disposed between the guide portion 90 and the tube 52. Accordingly, the pretensioner rod 53 exiting the tube 52 will contact the tread head pinion 64 prior to contacting the guide portion 90.

The guide 90 has a generally arcuate landing surface 92 that has a concave shape toward the exit of the tube 52. In one approach, the arc of the surface 92 has a constant radius. Further, the center point of the radius of the arc is aligned with the rotational axis of the tread head pinion 64, such that the radial spacing between the surface 92 and the tread head pinion 64 is consistent along the length of the surface 92. In another approach, the center point of the radius of the surface 92 could be offset from sprocket axis, such that the radial spacing between the surface 92 and the outer diameter of the tread head pinion 64 will vary at different points along the surface 92.

The surface 92 includes a first end 96 and second end 98. The first end 96 is disposed opposite the exit of the tube 52 such that the pretensioner rod 53 would engage the first end 96 prior to the second end 98 after exiting the tube 52 and passing the tread head pinion 64.

The housing 54 further defines an overflow cavity 100 that is disposed opposite the guide 90. The overflow cavity 100 is also disposed adjacent the curvature of the tube 52, and the tread head pinion 64 is disposed between the guide 90 and the overflow cavity 100. Accordingly, an intermediate portion 101 of the guide 90 is diametrically opposite the overflow cavity 100 across the tread head pinion 64.

The overflow cavity 100 is sized and configured to allow a portion the pretensioner rod 53 to be received therein during actuation of pretensioner system 44, if necessary. For example, after the pretensioner rod 53 has exited the tube 52 it will contact the guide 90 and be directed in an arcuate path corresponding to the guide 90, such that the pretensioner rod 53 is ultimately directed toward the overflow cavity 100. The pretensioner rod 53 can extend into the overflow cavity 100, and can further be guided along the curvature of the tube 52 that is adjacent the overflow cavity 100. However, it will be appreciated that the pretensioner rod 53 may not necessarily travel far enough during actuation to ultimately reach the overflow cavity 100.

As described above, the retractor assembly 32 includes the gas generator 36 that provides expanding gas in response to a firing signal. The expanding gas causes an increase in pressure within the tube 52, which ultimately causes the pretensioner rod 53 to be forced away from the gas generator 36, through the tube 52, and pass the exit into the tread head pinion 64 for pretensioning.

More particularly, as shown in FIG. 10C, the pretensioner tube 52 includes a piston or seal member 102. The seal member 102 can have a spherical shape with a spherical outer surface, in one approach. In another approach, the seal member 102 can have a generally cylindrical shape with a cylindrical outer surface. The seal member 102 is slidably disposed within the tube 52 and is operable to drive the pretensioner rod 53 along an actuating direction or path A. As will be understood by those of skill in the art, the seal member 102 may be press-fitted or otherwise fitted inside the tube 52.

As shown in FIG. 10C, the seal member 102 defines a proximal end 106 spaced from the gas generator 36 so as to define a gas chamber 108 therebetween. The seal member 102 defines a distal end 110 directed toward the stopper 55 and the pretensioner rod 53.

The stopper 55 is preferably made from aluminum, but could be made from another suitable material of sufficient strength, such as steel, other metal or metal alloy, or reinforced plastic with the seal member 102 being generally softer such that it can provide the described sealing abilities. In an exemplary embodiment, the stopper 55 has an outer perimeter that substantially matches the perimeter of the non-recessed portion 206. The stopper 55 is adjacent the distal end 110 of the seal member 102 and abuts the non-recessed portion 206 of the pretensioner rod 53.

The seal member 102 and the stopper 55 cooperate to transfer the energy from the increased pressure in the gas chamber 108 to the pretensioner rod 53. The pretensioner rod 53, in order to travel through the tube 52 and flex according to the curvature of the tube 52, is sized slightly smaller than the width of the tube 52. Thus, without the seal member 102, gas from the gas generator 36 would flow past the pretensioner rod 53 in the space defined between the pretensioner rod 53 and the tube 52.

The seal member 102 defines a generally elastic structure, and may be composed of various materials known in the art, such as any suitable plastic or polymer (e.g., polyester, rubber, thermoplastic, or other elastic or deformable material). Moreover, the seal member 102 may be die cast, forged, or molded from metal, plastic, or other suitable material. In one embodiment, the seal member 102 is formed using a two-cavity injection molding process. The generally elastic structure allows the shape of the seal member 102 to change slightly in response to pressure, thereby improving the sealing that it provides.

Figure 11:
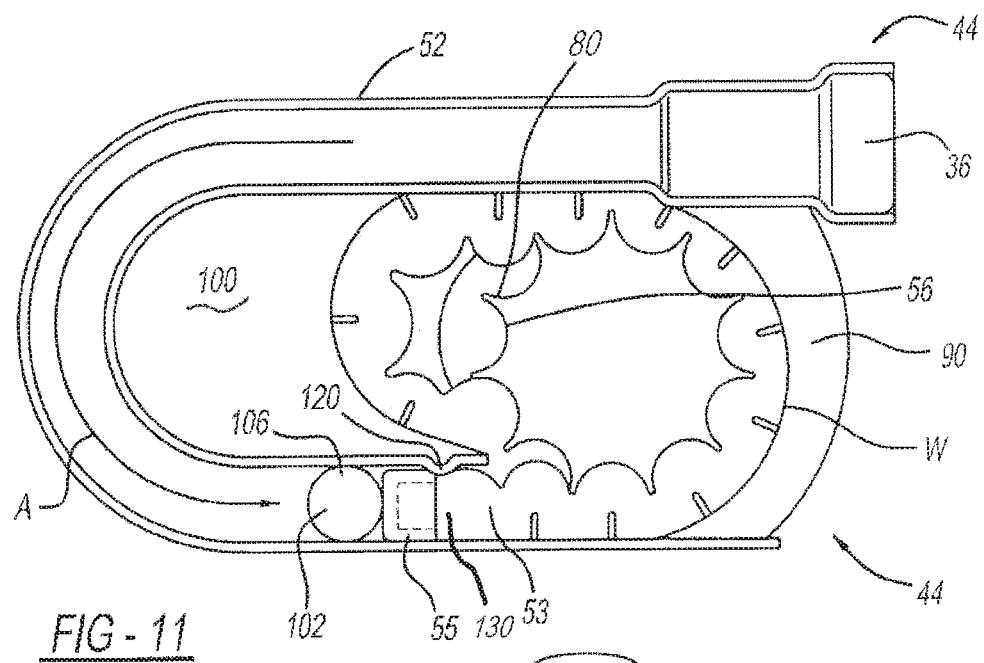
FIG. 11 is a cross-sectional view of the seatbelt pretensioning retractor assembly in an actuated position in accordance with an exemplary embodiment.

Referring to FIGS. 10C and 11, in operation, the gas generator 36 produces expanding gas that pressurizes the gas chamber 108, thereby enabling the seal member 102 to forcibly drive the pretensioner rod 53 along the actuation path A. As the pretensioner rod 53 is driven through the tube 52, it engages the tread head pinion 64. More particularly, the pretensioner rod 53 engages the teeth 80 of the tread head pinion 64. Engagement of the pretensioner rod 53 with the tread head pinion 64 as the pretensioner rod 53 is driven by expanding gas in the direction of arrow A causes the belt spool 40 (shown in FIG. 3) to rotate, which in turn provides pretensioning.

Activation of the gas generator 36 enables the seal member 102 to resist gas leakage. As previously mentioned, the seal member 102 is composed of a relatively elastic material. Therefore, pressurized gas within the gas chamber 108 causes the proximal end 106 of the seal member 102 to expand, which helps prevent gas from escaping past the seal member 102.

In addition, backpressure generated from the pretensioner rod 53 causes the seal member 102 to expand circumferentially outward due to compression of the seal member 102 against the stopper 55 and the pretensioner rod 53. The pretensioner rod 53 undergoes resistance as it engages the tread head pinion 64 during actuation, thereby generating backpressure on the stopper 55 and the seal member 102. The circumferential expansion of the seal member 102 provides a tightened seal between the outer surface of the seal member 102 and the inner wall of the pretensioner tube 52. Accordingly, the seal member 102 of the present invention is operable to retain a high seal pressure as well as maintain residual gas pressure within the tube 52.

During pretensioning of the seatbelt there can be a side-effect known as payback, where the tension on the seatbelt caused by the occupant during an event triggering pretensioning can rotate the spool in a direction opposite the pretensioning rotation. This rotation is transferred to the tread head pinion 64 and the driving elements, causing the driving elements to travel in the reverse direction within the tube 52. Payback can be counteracted by maintaining pressure in the tube 52, but this requires the gas generator 36 to fire for a longer period and additional propellant.

However, in an exemplary embodiment, the pretensioner system 44 described herein includes features configured to counteract the above described payback side-effect as an alternative to or in addition to maintained gas pressure. As described above, the pretensioner rod 53 is preferably made of a plastically deformable material, such as a polymer.

During actuation of the pretensioner system 44, the pretensioner rod 53 exits the tube 52 and contacts the teeth 80 of the tread head pinion 64, causing the tread head pinion 64 to rotate. As the pretensioner rod 53 continues past the tread head pinion 64 causing it to rotate, additional ones of teeth 80 will contact the side of the pretensioner rod 53, causing the pretensioner rod 53 to be compressed and deformed plastically in the area of interference between the teeth 80 and the pretensioner rod 53. This compression will also cause the pretensioner rod 53 to be compressed against the guide 90, creating a press-fit configuration of the pretensioner rod 53 between the tread head pinion 64 and the guide 90.

Additionally, the pretensioner rod 53 and guide 90 may be made from materials that will weld together at the end of the pretensioning stroke. For example, the materials of the pretensioner rod 53 and guide 90 may be selected such that heat generated from the friction between the pretensioner rod 53 and the guide 90 will cause the pretensioner rod 53 and guide 90 to become welded together along an interface W where the guide 90 and rod 53 contact each other. Once the pretensioner rod 53 and guide 90 are welded together, the pretensioner rod 53 will become locked and prevented or substantially limited from traveling back into the tube 52. The plastic deformation of the pretensioner rod 53 caused by the teeth 80 will prevent or substantially limit the tread head pinion 64 from rotating in the opposite direction, thereby preventing or substantially limiting payback.

The welding results from the relatively high heat and pressure generated by the system during actuation. For the pretensioner rod 53 and guide 90 to weld, the materials used for each are preferably in the same family. For example, if the guide 90 is nylon, then the pretensioner rod 53 is preferably nylon. Similarly, if the guide 90 is acetal, then the pretensioner rod 53 is preferably acetal. If the guide 90 is polypropylene, then the pretensioner rod 53 is polypropylene. It will be appreciated that other materials that will weld together under high heat and pressure could also be used. Moreover, it will be appreciated that some different types of materials can weld together.

Another side-effect that can occur during pretensioning is known as a low-resistance condition. This can occur when there is a relatively large portion of the seatbelt webbing that can be taken up or wound by the spool in response to actuating the pretensioner. For example, if there was extra slack in the seatbelt, this slack would be taken up and wound with lower resistance because it would not be acting on the occupant until the slack was taken up. In a low resistance condition, the backpressure of the driving elements is reduced. Reduced backpressure can result in a reduced ability of the sealing element to expand circumferentially against the inner wall surface of the tube in response to the backpressure. This can occur for any type of piston or seal that is configured to expand circumferentially in response to backpressure as part of its sealing process.

With reference to FIGS. 4, 8, 11, and 12 to address the side-effect of a low-resistance condition of the pretensioner system 44, in an exemplary embodiment, the tube 52 includes a projection 120 extending within the tube 52 near an end of the tube 52 to form a constriction portion 130 proximate to where the pretensioner rod 53 exits, thereby reducing the cross-sectional area of the tube 52 in a distinct location. That is, the opening diameter, width, or dimension(s) of the constriction portion 130 is smaller than the diameter, width, or dimension(s) of adjacent portions of the tube 52 portions, such as, for example, the portions of the tube 52 that are upstream from the constriction portion 130.

As will be discussed in further detail below, the recess 210 is aligned with the projection 120 along the actuating direction or path A such that during actuation and/or pretensioning, the recessed portion 208 of the pretensioner rod 53 is not obstructed by the projection 120. Moreover, the constriction portion 130 is sized such that there is enough space that at least the recessed portion 208 of the pretensioner rod 53 can travel past the constriction portion 130, but the stopper 55 and seal member 102 will be blocked from travelling past the constriction portion 130. When the stopper 55 and the seal member 102 are blocked from advancing past the constriction portion 130, the constriction portion 130 provides additional backpressure. Accordingly, the seal member 102 will circumferentially or radially expand in response to this backpressure, thereby providing an improved seal in low-resistance conditions. This improved sealing will prevent or limit the potential for gas to escape from the tube in low-resistance conditions.

The projection 120 defining the constriction portion 130 can be formed in a variety of ways and have a variety of shapes while providing the above described functionality.

In the above approaches, the projection 120 with the recess 210 of the pretensioner rod 53 aligned therewith may be disposed along an inboard portion of the tube 52 as illustrated in FIGS. 4 and 11, or alternatively, may be disposed along an outboard portion of the tube 52, as illustrated in FIGS. 8 and 12. Advantageously, in an exemplary embodiment, disposition of the projection 120 on the inboard portion of the tube 52 facilitates the pretensioner rod 53 sliding across the outboard portion of the tube 52 during travel. The centrifugal force of the pretensioner rod 53 as it travels through the tube 52 will tend to force the pretensioner rod 53 toward the outboard portion of the tube 52, so locating the projection 120 on the inboard portion helps reduces the potential for the constriction portion 130 to add resistance to the pretensioner rod 53. Alternatively and advantageously, in an exemplary embodiment, disposition of the projection 120 on the outboard portion of the tube 52 facilitates the tread head pinion 64 engaging the fully or solid side of the pretensioner rod 53 (e.g., tread head pinion 64 engaging side of the pretensioner rod 53 opposite the recess 210) during actuation to facilitate locking the pretensioner rod 53 with the tread head pinion 64 to prevent or reduce any translation of the pretensioner rod 53 in a direction opposite the actuating direction or path A.

As described above, the pretensioner rod 53 has the non-recessed portion 206 at its proximal end portion 202, where the non-recessed portion 206 has a larger diameter or cross-sectional dimension(s) than the recessed portion 208. In one approach, the non-recessed portion 206 has a diameter or cross-sectional dimension(s) that is larger than the width or cross-sectional dimension(s) of the tube 52 at the constriction portion 130. Accordingly, with the non-recessed portion 206 disposed upstream of the constriction portion 130, the constriction portion 130 will prevent the non-recessed portion 206 from passing.

In another approach, the non-recessed portion 206 can be smaller than the width or cross-sectional dimension(s) of the tube 52 at the constriction portion 130. With the non-recessed portion 206 being small enough to pass the constriction portion 130, it can pass beyond the constriction portion 130.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A pretensioning device for use in a seat belt retractor assembly, the device comprising:
   a rotatable spindle configured for taking up seat belt webbing in response to rotation of the spindle, wherein the spindle rotates about a central longitudinal axis;
   a tread head pinion operatively coupled to the spindle, the tread head pinion configured to rotate in response to a pretensioning load applied thereto, wherein rotation of the tread head rotates the spindle;
   a deformable rod configured to translate along a predetermined path into direct engagement with the tread head pinion in response to actuation of the rod, wherein the translation and engagement of the rod with the tread head pinion rotates the tread head pinion;
   wherein the tread head pinion comprises:
   a first side facing away from the spindle and a second side facing toward the spindle;
   a ring portion extending between the first and the second sides and having a plurality of radially protruding teeth for engaging with the rod upon the actuation;
   a pair of flanges including a first flange at the first side and a second flange at the second side disposed on opposite sides of the teeth and projecting radially outward beyond the teeth, the flanges disposed longitudinally adjacent the plurality of teeth, wherein the teeth blend into the flanges to define a cavity between adjacent teeth and the flanges; and
   a bearing portion projecting axially from the second flange toward the spindle, the bearing portion defining a bearing surface for the spindle,
   wherein the tread head pinion further comprises a bending element and a bending element mounting portion projecting axially away from the bearing portion and toward the spindle, wherein the bending element mounting portion defines a notch in a circumference of the bending element mounting portion, the notch extending from an axial outermost surface of the bending element mounting portion toward the bearing portion, wherein the bearing portion defines a staking cavity disposed axially adjacent the notch of the bending element mounting portion, the staking cavity extending into the bearing portion from an axially outermost surface of the bearing portion.

2. The device of claim 1, wherein the tread head pinion further comprises a shaft protruding axially away from the first side of the tread head pinion and the spindle.

3. The device of claim 1, wherein the bearing portion has a generally circular outer profile with an outer diameter less than an outer diameter of the second flange.

4. The device of claim 3, wherein the bending element mounting portion has a generally circular outer profile with an outer diameter less than the outer diameter of the bearing portion.

5. The device of claim 1 further comprising the bending element is in the form of a digressive bending element attached to the tread head pinion and the spindle.

6. The device of claim 1, wherein the bending element mounting portion defines a smooth outer circumferential surface over a majority of a circumference of the bending element mounting portion.

7. The device of claim 1, wherein the bearing portion defines an access cavity disposed radially outward from and adjacent the staking cavity, the access cavity extending into the bearing portion from the axially outermost surface of the bearing portion.

8. The device of claim 7, wherein the bearing portion defines a staking wall disposed radially between the access cavity and the staking cavity, the staking wall being deformable in a radial direction to stake the bending element in the form of a digressive bending element to the tread head pinion.

9. The device of claim 1, further comprising the bending element in the form of a digressive bending element, wherein the entire digressive bending element is disposed radially outward relative to the bending element mounting portion.

10. The device of claim 1, wherein the tread head pinion defines a central inner cavity extending axially through the bearing portion and into the ring portion, the inner cavity having a splined surface for receiving a corresponding structure of a torsion bar.

11. The device of claim 1, further comprising a torsion bar attached at one end to the tread head pinion and extending through the bearing portion and into the ring portion, wherein the torsion bar is attached to the spindle at an opposite end thereof.

12. The device of claim 1, wherein the ring portion has a radial thickness that extends radially inward beyond an outer circumference of the bending element mounting portion.

13. A pretensioning device for use in a seat belt retractor assembly, the device comprising:
   a rotatable spindle configured for taking up a seat belt webbing in response to rotation of the spindle, wherein the spindle rotates about a central longitudinal axis;
   a tread head pinion operatively coupled to the spindle, the tread head pinion configured to rotate in response to a pretensioning load applied thereto, wherein rotation of the tread head rotates the spindle;
   a deformable rod configured to translate along a predetermined path into direct engagement with the tread head pinion in response to actuation of the rod, wherein the translation and engagement of the rod with the tread head pinion rotates the tread head pinion;
   wherein the tread head pinion comprises:
   a first side facing away from the spindle and a second side facing toward the spindle;

a ring portion extending between the first and second sides and having a plurality of radially protruding teeth for engaging with the rod upon the actuation;

a pair of flanges including a first flange at the first side and a second flange at the second side disposed on opposite sides of the teeth and projecting radially outward beyond the teeth, the flanges disposed longitudinally adjacent the plurality of teeth, wherein the teeth blend into the flanges to define a cavity between adjacent teeth and the flanges, wherein the plurality of teeth each define a first surface and a second surface facing a circumferential direction and extending radially inward from a radially outer apex toward a base of the tooth, wherein a first angle $\alpha$ defined between the first surface and a line extending between the apex and the central axis of the tread head pinion is less than or equal to a second angle $\beta$ defined between the second surface and the line, wherein the first surface faces an exit of a tube carrying the rod; and a torsion bar extending into an inner cavity defined by the ring portion of the tread head pinion and being attached to the tread head pinion at a first end and the spindle at a second end.

14. The device of claim 13, wherein the first angle $\alpha$ is 25 degrees and the second angle $\beta$ is 30 degrees.

15. The device of claim 13, wherein the flanges each include a chamfer at an inner corner of an outer edge of the flanges.

16. The device of claim 13, wherein the tread head pinion includes fillets between the teeth and the flanges.

* * * * *